United States Patent
Mastro et al.

(10) Patent No.: US 7,152,375 B1
(45) Date of Patent: Dec. 26, 2006

(54) SEAL INTEGRITY DETECTION SYSTEM

(75) Inventors: Stephen A. Mastro, Glen Mills, PA (US); John K. Overby, Nottingham, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 266 days.

(21) Appl. No.: 10/654,962

(22) Filed: Sep. 5, 2003

(51) Int. Cl.
*F16J 15/00* (2006.01)

(52) U.S. Cl. .................. 49/507; 49/475.1; 49/395; 49/402; 277/321; 73/790

(58) Field of Classification Search .............. 49/475.1, 49/395, 507, 402; 277/317, 318, 321; 73/49.8, 73/46, 790
See application file for complete search history.

(56) References Cited

U.S. PATENT DOCUMENTS

| | | | | |
|---|---|---|---|---|
| 4,722,151 A | * | 2/1988 | Westwell | 49/477.1 |
| 5,121,929 A | * | 6/1992 | Cobb | 277/317 |
| 5,185,579 A | | 2/1993 | Mertens et al. | |
| 5,216,840 A | | 6/1993 | Andrews | |
| 5,295,326 A | | 3/1994 | Dickey | |
| 5,540,448 A | * | 7/1996 | Heinzen | 277/321 |
| 5,553,871 A | | 9/1996 | Rowe et al. | |
| 5,581,019 A | * | 12/1996 | Minor et al. | 73/115 |
| 5,705,984 A | * | 1/1998 | Wilson | 340/561 |
| 5,916,671 A | * | 6/1999 | Dauber et al. | 428/317.3 |
| 6,003,872 A | * | 12/1999 | Nord | 277/317 |
| 6,281,801 B1 | | 8/2001 | Cherry et al. | |
| 6,329,617 B1 | | 12/2001 | Burgess | |
| 6,465,752 B1 | | 10/2002 | Meagher et al. | |
| 6,591,662 B1 | * | 7/2003 | Grimard et al. | 73/46 |
| 6,879,256 B1 | * | 4/2005 | Redfern et al. | 340/545.3 |

* cited by examiner

Primary Examiner—Gregory J. Strimbu
(74) Attorney, Agent, or Firm—Steven W. Crabb

(57) ABSTRACT

A seal integrity verification system scans for changes in impedance in a seal with integral coaxial waveguide, twisted pair wires, parallel ribbon wires or parallel wires. The wires are monitored by a TDR to note changes in impedance. The changes indicate the location where the seal is not under proper compression to ensure a tight fit. This is especially useful in verifying that watertight doors on ships or submarines are sealing properly when shut.

8 Claims, 2 Drawing Sheets

SEAL INTEGRITY DETECTION SYSTEM

STATEMENT OF GOVERNMENT INTEREST

The invention described herein may be manufactured and used by or for the Government of the United States of America for governmental purposes without payment of any royalties thereon or therefore.

BACKGROUND OF THE INVENTION

The integrity of seals is often a critical element in the operation of various items. Nowhere is this truer than in doors, especially watertight doors, on ships. Watertight doors and hatches are critical to controlling flooding on ships and submarines. These doors often handle large amounts of traffic, cycling the doors open and shut several thousand times a week, causing the seal integrity to fade. Such doors often require extensive adjustments and maintenance in order to maintain a fluid tight closure. The twisting and flexing that occurs on ships cause doors to warp or bend resulting in loss of seal integrity. Other than periodic spot checks, there is currently no way to check the seal integrity on a continuous basis.

The current way to check seal integrity of watertight doors is to perform a chalk test. The chalk test is a simple means of determining if the gasket is in continuous contact with the knife-edge of the doorframe when the door is closed. Chalk is rubbed on the knife-edge of the doorframe and the door is shut and dogged tight. The door is then opened and the chalk line on the seal should be continuous if the door is adjusted properly. A non-continuous chalk line on the gasket indicates that the dogs are not pressing the gasket against the knife-edge properly. However, the chalk test does not guarantee that the door is watertight, as it does not measure seal compression.

Chalk tests are preformed on a periodic basis as it is a labor intensive test. Doors and doorframes, especially the knife-edges, are subject to wear and tear with repeated use. Additionally, the frames and surrounding structures are often subject to stresses that may warp or bend the frames or surrounding structure. This may mean that even though the chalk test was successful, subsequent damage to the door or frame might occur that causes a bad fit that will not be discovered until the next chalk test.

Another method used to check seal integrity uses acoustic transducers. In this test, transducers are placed on one side of a closed door to produce acoustic energy and the quality of the seal is surmised based on the amount of acoustic energy received. However, such a method is labor intensive and does not provide continuous feedback.

What is needed is an apparatus that can quickly and continuously determine if the seal is engaged adequately on a closed door.

SUMMARY OF THE INVENTION

In the present invention there is provided a first insulated conductive waveguide and a second conductive waveguide threaded through a seal. A time domain reflectometer (TDR) is connected the waveguides, whereby reflected pulses are detected indicating an area where the seal is not compressed adequately.

In accordance with the present invention a seal integrity checking system includes a first insulated conductive waveguide and a second insulated conductive waveguide inside a seal or gasket. A pulse generator may be operatively connected to the first and second waveguides and a pulse detector may be operatively connected to the first and second waveguides to detect reflected pulses that indicate an area where the seal is not compressed adequately.

In an alternative embodiment of the present invention there is provided a seal integrity checking system that includes a gasket disposed around the periphery of a door that has a first insulated conductive waveguide embedded in the gasket and a second insulated conductive waveguide embedded in the gasket. The waveguides are separated by a dielectric and a pulse generator is operatively connected to the first and second waveguides. A pulse detector is operatively connected to the first and second waveguides so that the reflected pulses are detected and indicate an area where the seal is not compressed adequately For a better understanding of the present invention, together with other and further objects thereof, reference is made to the following description, taken in conjunction with the accompanying drawings, and its scope will be pointed out in the appended claims.

DESCRIPTION OF THE PREFERRED EMBODIMENT

Figure 1:
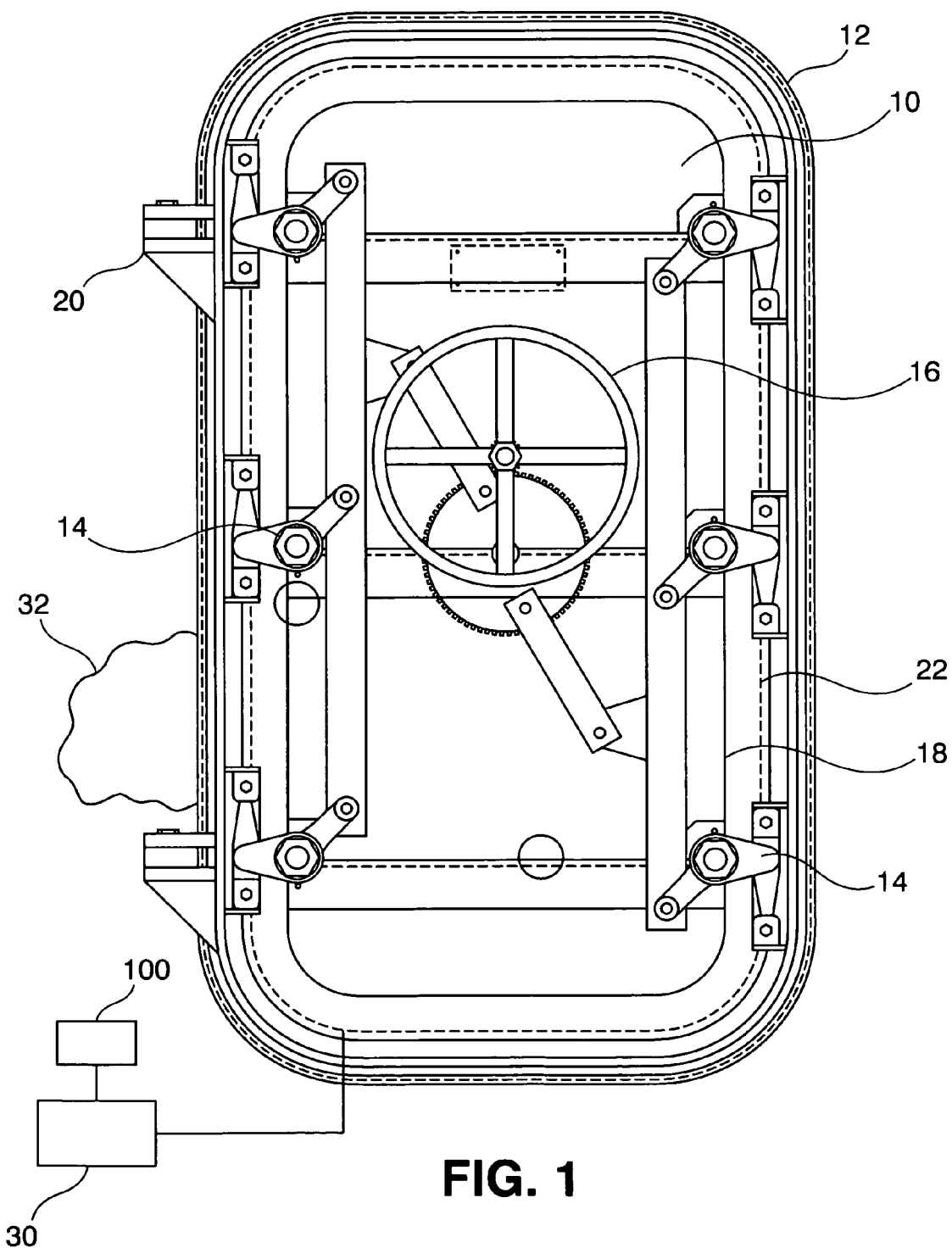
FIG. 1 is a front elevation view of an example shipboard watertight door, doorframe assembly and a Time Domain Reflectometry instrument.

Referring now to the example of FIG. 1, a door seal integrity verification system in accordance with the present invention is illustrated diagrammatically. The door 10 shown in the figure is an example of a watertight door on a ship. The watertight closure includes a movable door 10 on hinges 20 that is attached to the bulkhead 32 by a doorframe 12. The door 10 includes a latching mechanism that includes a door latching handle 16 and numerous dogs 14 that operate through linkages 18 to latch the door 10 and form a watertight seal by compressing gasket 22. The door 10 is only watertight if the gasket 22 is compressed properly between the door 10 and the doorframe 12. The time domain reflectometry (TDR) 30 interrogates an embedded waveguide to verify adequate compression of the seal 22.

TDR works by transmitting a pulse of energy down a transmission wire or cable and then the TDR instrument measures reflected pulses that indicate either the end of the transmission line or a fault somewhere along the line. A TDR instrument sends high frequency electrical impulse signals down the line and samples the reflected energy utilizing a pulse generator and a pulse detector. Impedance changes in the line will cause a reflection of some of the energy back toward the TDR and the instrument registers the reflections. The TDR works with transmission lines that include two metallic waveguides or conductors close together and are separated by a dielectric. The TDR may be used with parallel-insulated wires, parallel ribbon cable or a coaxial wire. This technique for using TDRs and interpreting measurements are generally well known.

Figure 2A:
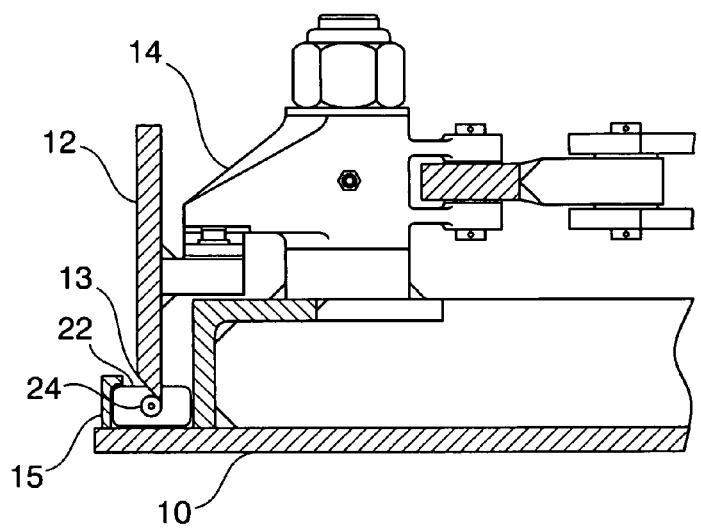
FIG. 2A is a partial cross sectional view of the door gasket with an embedded waveguide in accordance with the present invention.

FIG. 2A is an enlarged partial cross sectional view of the door 10 and doorframe 12 sealing arrangement in accordance with the present invention. When the door 10 is latched shut by the action of the handle and dogs 14, the knife edge 13 of the doorframe 12 compresses the gasket 22 in the door seal channel 15 to form a watertight seal. In the present invention the seal 22 has embedded in it a transmission line 24 suitable for interrogation by a TDR 30. It may be a coaxial waveguide as illustrated in the example of FIG. 2A. When the door 10 is latched the gasket 22 and waveguide 24 are compressed. By interrogating the coaxial waveguide 24 with the TDR 30 the quality of the seal can be inferred by the impedance change along the gasket 22 with embedded waveguide 24. The most drastic change in impedance is between the gasket 22 being in an uncompressed state for instance when the door 10 is open and when the gasket 22 is compressed when the door 10 is closed. More useful information may be obtained once the door 10 is closed. Starting with a properly adjusted door 10 measurements can be taken to set a baseline of results for the compressed seal 22 readings. Subsequent uses of the door 10 while the system is interrogating the seal 22 coaxial waveguide 24 would identify areas along the coaxial waveguide 24 that are not sealed properly. Reflections at such locations would indicate an improper seal that must be investigated to check for warping of the door 10 or doorframe 12 or other mechanical failure in a part such as the dogs 14.

Figure 2B:
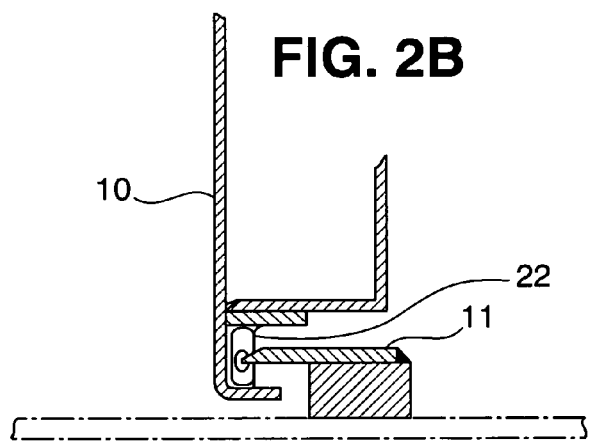
FIG. 2B is a partial cross sectional view of the door sill area and the seal with an embedded waveguide in accordance with the present invention.

FIG. 2B is a partial cross section of the sill area of the door 10 and doorframe 12. The seal 22 can be seen in a channel 15 along the edge of the door 10. Embedded in the seal 22 is a waveguide 24, preferably coaxial, that will have increased pressure on it when the door 10 is sealed properly to ensure that the door 10 is watertight.

Figure 3:
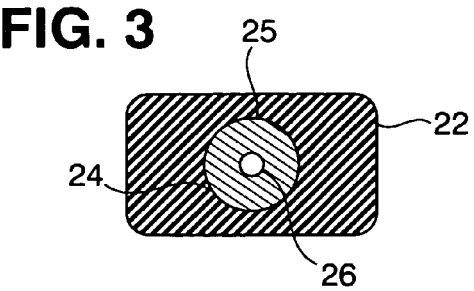
FIG. 3 is an enlarged cross section of a gasket and embedded waveguide in accordance with the present invention.

FIG. 3 is an enlarged cross section of the gasket 22 with an embedded waveguide 24. In this view the center conductor 26 and dielectric 25 can be clearly seen. The TDR 30 could be mounted either on the face of the door 10 or nearby and would connect to the coaxial waveguide through leads running from the TDR 30 to the center conductor 26 and the outer conductive element of the waveguide 24. Alternatively, the door seal integrity verification system may be connected to the damage control system of a ship in order to provide information about the status of the watertight doors throughout the ship. In another embodiment of the present invention the seal integrity verification system would output the results to a display assembly 100 such as an LCD that would depict the door and highlight areas on the screen corresponding to improper seal compression.

While there have been described what are believed to be the preferred embodiments of the present invention, those skilled in the art will recognize that other and further changes and modifications may be made thereto without departing from the spirit of the invention, and it is intended to claim all such changes and modifications that fall within the true scope of the invention.

What is claimed is:

1. A watertight door seal integrity verification assembly comprising:
   a watertight door in a door frame;
   a gasket disposed in a channel formed around a periphery of the door;
   a closure edge of the door frame positioned to compress the gasket upon latching the door shut;
   a transmission line embedded in the gasket, the transmission line operatively coupled to a time domain reflectometry device; and
   a display associated with the time domain reflectometry device to indicate a gasket compression status,
     wherein the gasket compression status includes a presence of an improper gasket compression,
     wherein the display comprises a visual representation of the watertight door and a visual representation of the gasket compression status along the periphery the watertight door, and
     wherein the visual representation of the gasket compression status includes visually distinguishing at least one portion of said gasket having said improper gasket compression from another portion of said gasket not having said improper gasket compression.

2. A watertight door seal integrity verification assembly as in claim 1, wherein the transmission line is a twisted pair of insulated wires.

3. A watertight door seal integrity verification assembly as in claim 1, wherein the transmission line is a coaxial cable.

4. The watertight door seal integrity verification assembly of claim 1 wherein the display is located at a location remote from a location of the gasket.

5. A watertight door seal integrity verification system comprising:
   a gasket configured to be disposed around a periphery of a watertight door, the gasket configured to be compressed upon closing of the watertight door;
   a transmission line embedded in the gasket;
   a time domain reflectometry device operatively coupled to the transmission line; and
   a display associated with the time domain reflectometry device to indicate a gasket compression status,
     wherein the gasket compression status includes a presence of an improper gasket compression,
     wherein the display comprises a visual representation of the watertight door and a visual representation of the gasket compression status along the periphery the watertight door, and
     wherein the visual representation of the gasket compression status includes visually distinguishing at least one portion of said gasket having said improper gasket compression from another portion of said gasket not having said improper gasket compression.

6. The system of claim 5 wherein the display is located at a location remote from a location of the gasket.

7. The system of claim 5 wherein the transmission line is a twisted pair of insulated wires.

8. The system of claim 5 wherein the transmission line is a coaxial cable.

* * * * *